(12) United States Patent
Sameshima

(10) Patent No.: US 6,593,941 B1
(45) Date of Patent: Jul. 15, 2003

(54) AUDIO-VIDEO CONTROL SYSTEM

(75) Inventor: Tetsuro Sameshima, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/472,834

(22) Filed: Dec. 28, 1999

(30) Foreign Application Priority Data

Dec. 28, 1998 (JP) .......................................... 10-374417

(51) Int. Cl.$^7$ ................................................ G09G 5/00
(52) U.S. Cl. ...................... 345/716; 345/810; 345/835; 345/840; 345/717; 345/719
(58) Field of Search ................................ 345/716, 717, 345/719, 720, 721, 764, 781, 788, 810, 835, 840

(56) References Cited

U.S. PATENT DOCUMENTS

| | | | | |
|---|---|---|---|---|
| 5,519,438 A | * | 5/1996 | Elliott et al. ................. | 348/180 |
| 5,544,300 A | * | 8/1996 | Skarbo et al. ............... | 345/157 |
| 5,602,597 A | * | 2/1997 | Bertram ....................... | 348/565 |
| 5,682,511 A | * | 10/1997 | Sposato et al. .............. | 345/353 |
| 5,687,331 A | * | 11/1997 | Volk et al. ................... | 345/327 |
| 6,292,620 B1 | * | 9/2001 | Ohmori et al. ............... | 386/55 |
| 6,335,736 B1 | * | 1/2002 | Wagner et al. ............... | 345/716 |

FOREIGN PATENT DOCUMENTS

| | | |
|---|---|---|
| JP | 06-233352 | 8/1994 |
| JP | 09-198177 | 7/1997 |
| JP | 10-200969 | 7/1998 |

* cited by examiner

Primary Examiner—Kristine Kincaid
Assistant Examiner—Mylinh Tran
(74) Attorney, Agent, or Firm—Rader Fishman & Grauer PLLC

(57) ABSTRACT

An AV control system comprises a controller having a plurality of AV devices connected thereto, and a touch panel input unit having a touch panel covering a screen. For each of contents select buttons for commanding operations, the controller has stored therein a button code for specifying the position of the button displayed, an operation code for specifying an operation and a button name data indicating the name of the button. Two select buttons manipulated on a contents arrangement frame displayed on the input unit are replaced with each other with respect to the operations codes and the button name data in a contents arrangement table, whereby the contents select buttons are made convenient and efficient to use.

4 Claims, 16 Drawing Sheets

FIG. 8

| BUTTON CODE | OPERATION CODE | BUTTON NAME |
|---|---|---|
| 1 | $F_1$ | VCR − 1 |
| 2 | $F_2$ | VCR − 2 |
| 3 | $F_3$ | TV |
| 4 | $F_4$ | Music |
| 5 | $F_5$ | BGM |
| 6 | $F_6$ | Movie − D |
| 7 | $F_7$ | Sports |
| 8 | $F_8$ | Security |
| 9 | $F_9$ | Favorite |
| ⋮ | ⋮ | ⋮ |
| 21 | $F_{21}$ | AllOff |
| 22 | $F_{22}$ | DVD2 |
| 23 | $F_{23}$ | LDP2 |
| 24 | $F_{24}$ | CD2 |

FIG. 9

| BUTTON CODE | OPERATION CODE | BUTTON NAME |
|---|---|---|
| 1 | $F_1$ | VCR - 1 |
| 2 | $F_{22}$ | DVD2 |
| 3 | $F_3$ | TV |
| 4 | $F_4$ | Music |
| 5 | $F_5$ | BGM |
| 6 | $F_6$ | Movie - D |
| 7 | $F_7$ | Sports |
| 8 | $F_8$ | Security |
| 9 | $F_9$ | Favorite |
| ⋮ | ⋮ | ⋮ |
| 21 | $F_{21}$ | AllOff |
| 22 | $F_2$ | VCR - 2 |
| 23 | $F_{23}$ | LDP2 |
| 24 | $F_{24}$ | CD2 |

FIG. 15

| BUTTON CODE | OPERATION CODE | BUTTON NAME |
|---|---|---|
| 1 | $F_1$ | VCR − 1 |
| 2 | $F_2$ | VCR − 2 |
| 3 | $F_3$ | TV |
| 4 | $F_4$ | Music |
| 5 | $F_5$ | BGM |
| 6 | $F_6$ | Movie − D |
| 7 | $F_7$ | Sports |
| 8 | $F_8$ | Security |
| 9 | $F_9$ | Favorite |

FIG. 16

| BUTTON CODE | BUTTON NAME |
|:---:|:---:|
| 10 | VCR |
| 11 | VCR1 |
| 12 | VCR - 1 |
| 13 | VTR |
| 14 | HomeV |
| 15 | — |
| 16 | — |
| 17 | — |
| 18 | — |
| 19 | — |
| 20 | — |
| 21 | — |
| 22 | — |
| 23 | — |
| 24 | — |

| BUTTON CODE | OPERATION CODE | BUTTON NAME |
|---|---|---|
| 1 | $F_1$ | HomeV |
| 2 | $F_2$ | VCR - 2 |
| 3 | $F_3$ | TV |
| 4 | $F_4$ | Music |
| 5 | $F_5$ | BGM |
| 6 | $F_6$ | Movie - D |
| 7 | $F_7$ | Sports |
| 8 | $F_8$ | Security |
| 9 | $F_9$ | Favorite |

TO STEP S36 OF FIG. 18

AUDIO-VIDEO CONTROL SYSTEM

FIELD OF THE INVENTION

The present invention relates to audio-video control systems (hereinafter referred to as "AV control systems") which comprise a controller connected to a plurality of devices including audio-video devices (herein-after referred to as "AV devices") and having an input unit, which is manipulated to control the operation of the plurality of devices.

BACKGROUND OF THE INVENTION

Already proposed is an AV control system as shown in FIG. 20 and comprising a host computer 40 connected via a device control unit 20 to a group 30 of devices such as a DVD player 31, VCR 32, LD player 33, CD player 34, TV receiver 35 and AV amplifier 37. The host computer 40 has an input-output unit, i.e., a keyboard 42, and a display 43, which are used for collectively operating the group 30 of AV devices.

The desired AV device can be caused to operate as desired using the AV control system by manipulating the keyboard 42 to select the desired AV device on a device select frame projected on the display 43, and further selectively manipulating required operating keys on a frame showing a plurality of operating keys for the selected device.

The AV control system is so adapted that when the user manipulates one contents select button among a plurality of contents select buttons which are shown on the display 43 for realizing the predetermined operations (contents) of one or more of the AV devices, the operation corresponding to the manipulated button can be performed.

However, the number of contents select buttons increases with an increase in the number of AV devices connected or in the number of different kinds of contents which can be realized, entailing the problem that each contents select button displayed correspondingly diminishes in size to present difficulty in manipulating the buttons. Furthermore, the contents select button which is manipulated frequently and the button which is manipulated seldom differ from user to user, whereas the contents select buttons to be displaced on the screen remain unchanged in kind and can not be changed as desired by the user, hence the problem that the contents select buttons are inconvenient to use.

Furthermore, the contents select buttons to be displayed on the screen are given respective names specified by the manufacturer, and the image of each button bears the specified name. Although the contents conceivable from the name differs from user to user, the name can not be changed as desired by the user. This lead to the problem that the contents select buttons are inefficient to manipulate.

SUMMARY OF THE INVENTION

Accordingly, an object of the present invention is to make the contents select buttons more convenient or efficient to use for use in AV control systems.

The present invention provides an AV control system which comprises a controller having connected thereto a plurality of devices including AV devices, the controller comprising an image display screen and an input unit enabling the user to perform input manipulations on the image display screen.

The controller comprises:
  contents select button display means for displaying on the image display screen specified contents select buttons among all contents select buttons prepared for commanding specified one or more of the devices to perform a predetermined operation,
  operation command means for commanding specified one or more of the devices to perform a predetermined operation in accordance with manipulation of one contents select button displayed by the contents select button display means,
  contents arrangement frame display means for displaying in a single frame on the image display screen a plurality of first contents select buttons to be displaced by first contents select button display means and a plurality of second contents select buttons other than the first contents select buttons in accordance with manipulation of the input unit, and
  contents arrangement change means operable in accordance with manipulation of the first contents select button and the second contents select button. which are displayed by the contents arrangement frame display means so that the contents select button display means and the contents arrangement frame display means display the two manipulated contents select buttons as replaced with each other.

When a plurality of contents select buttons displayed by the contents select button display means are to be changed, the input unit is first manipulated in the AV control system of the invention to display the first contents select buttons and the second contents select buttons in a single frame on the image display screen.

The contents select button (old contents select button) to be changed is then selected from among the first contents select buttons, and the contents select button (new contents select button) to be arranged anew is manipulated as selected from among the second contents select buttons. Consequently, the oil select button so far displayed by the select button display means is changed for the new select button, and the new select button so far displayed by the arrangement frame display means is replaced with the oil select button.

The new select button displayed by the select button display means is thereafter manipulated, whereby a command for operation corresponding to the select button is given to specified one or more of the devices to execute the predetermined operation.

Stated more specifically, the controller comprises: means for storing a contents arrangement table containing for each of the contents select buttons a button code for specifying the position of the select button displayed on the screen, an operation code for specifying an operation when the select button is manipulated, and button name data showing the name of the select button to be displayed on the screen, and the contents arrangement change means replaces the two manipulated contents select buttons with each other with respect to the operation codes and the button name data in the contents arrangement table.

In the contents arrangement frame showing the first select buttons and the second select buttons, therefore, the two manipulated select buttons remain unchanged in position as displayed on the screen, and the name of the button and the operation of the device to be performed when the button is manipulated in one displayed position are replaced by those in the other displayed position, and vice versa.

In a contents select frame showing the first contents select buttons only, the new select button and the name thereof are displayed at the position of the old select button displayed.

When the new select button is manipulated, the controller performs the predetermined operation based on the operation code of the new select button contained in the contents arrangement table.

The present invention further provides an AV control system of the type mentioned above including a controller which comprises:

contents select button display means for displaying on the image display screen a plurality of contents select buttons prepared for commanding specified one or more of the devices to perform a predetermined operation along with button names, operation command means for commanding specified one or more of the devices to perform a predetermined operation in accordance with manipulation of one contents select button displayed by the contents select button display means, name change list display means for displaying in accordance with manipulation of the input unit a list of a plurality of button names to be given to desired one contents select button among the plurality of contents select buttons, and name change control means operable in accordance with selection of one button name from among the plurality of button names displayed by the name change list display means to replace the selected button name displayed and the button name displayed by the content select button display means with each other.

When the name of one of the contents select buttons is to be changed in the AV control system of the invention described, the select button the name of which is to be changed is selected first by manipulating the input unit, and a plurality of names to be given to the selected button are displayed as listed.

The desired name to be given anew to the selected button is selected from the button name list. As a result, the button name (old name) so far displayed by the select button display means for the select button concerned is changed for the button name (new name) displayed by the name change list display means, and the button name (new name) displayed by the name change list display means is changed for the button name (old name) displayed by the select button display means.

The select button given the new name by the select button display means is thereafter manipulated, whereby a command for operation corresponding to the select button is given to the specified one or more of the devices to execute the predetermined operation.

Stated more specifically, the controller comprises:

means for storing a contents arrangement table containing for each of the contents select buttons a button code for specifying the position of the select button displayed on the screen, an operation code for specifying an operation when the select button is manipulated, and button name data showing the name of the select button to be displayed on the screen, and contents name table store means having stored therein a plurality of button names for each of the contents select buttons, and the name change control means causes the arrangement table storing means and the name table store means to transfer the button names therein to each other.

Accordingly, the select button the name of which is to be changed remains unchanged in its displayed position on the contents select frame and in the operation of the device to be performed when the button is manipulated, and only the name to be indicated on the button is changed.

When the select button bearing the new name is manipulated, the controller executes the predetermined operation based on the operation code of the select button contained in the contents arrangement table.

The AV control system of the present invention is so adapted that even if the number of devices connected thereto or the number of different kinds of contents which can be realized increases, only the contents select buttons which are manipulated frequently are selected and shown on a frame for giving operation commands. This feature makes it possible not only to display the select buttons in a sufficient size but also display only the favorite contents select buttons only, so that the select buttons are usable with greater ease and convenience.

Furthermore, the name of each contents select button displayed on the contents select frame for giving an operation command can be selected from among a plurality of names. This enables the user to select a particular name which appears most appropriate to the contents of operation. The contents select buttons can therefore be manipulated with an improved efficiency.

BRIEF DESCRIPTION OF THE DRAWINGS

FIG. 8 is a diagram showing a contents arrangement table before changing;

FIG. 9 is a diagram showing the contents arrangement table as changed;

FIG. 15 is a diagram showing a top table;

FIG. 16 is a diagram showing a name table;

DETAILED DESCRIPTION OF EMBODIMENT

Figure 1:
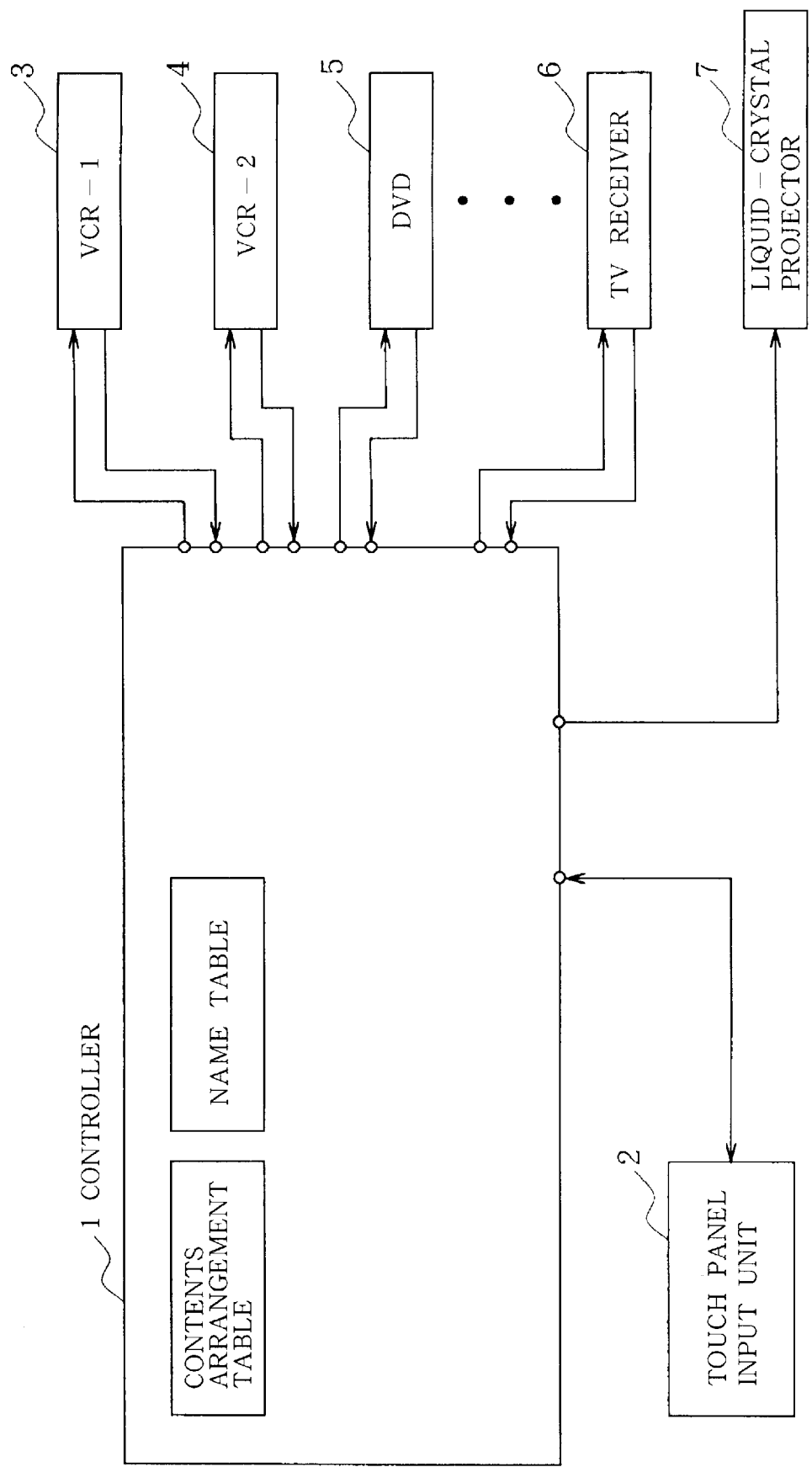
FIG. 1 is a block diagram showing the construction of an AV control system according to the invention.

With reference to FIG. 1, the present invention provides an AV control system which has a controller 1 comprising a microcomputer or the like and having connected thereto a touch panel input unit 2 provided with an image display screen, for example, of a liquid-crystal display and a touch panel covering the screen. Also connected to the controller 1 are AV devices, such as two VCRs 3, 4, DVD 5, TV receiver 6 and liquid-crystal projector 7.

Figure 20:
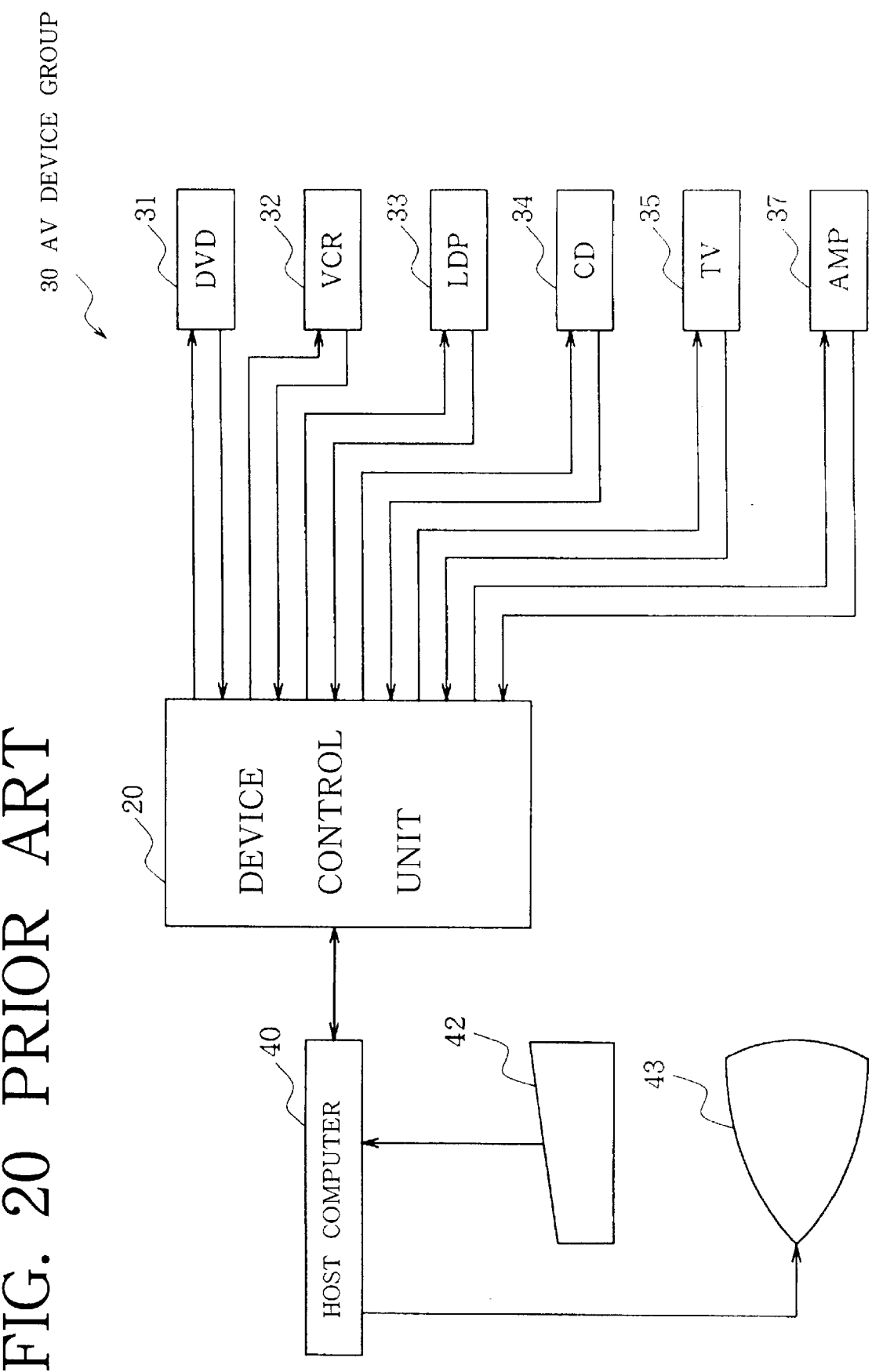
FIG. 20 is a block diagram showing a conventional control system.

The controller 1 has the functions of both the device control unit 20 and the host computer 40 which constitute the conventional AV control system shown in FIG. 20, and further has the function of changing the arrangement of contents select buttons (contents arrangement changing function) and the function of changing the names of contents select buttons (contents name changing function). The touch panel input unit 2 has incorporated therein a microcomputer, controls the display of images on the image display screen and processes communication with the controller 1.

The contents arrangement changing function and the contents name changing function will be described below in detail.

Contents Arrangement Changing Function

Figure 2:
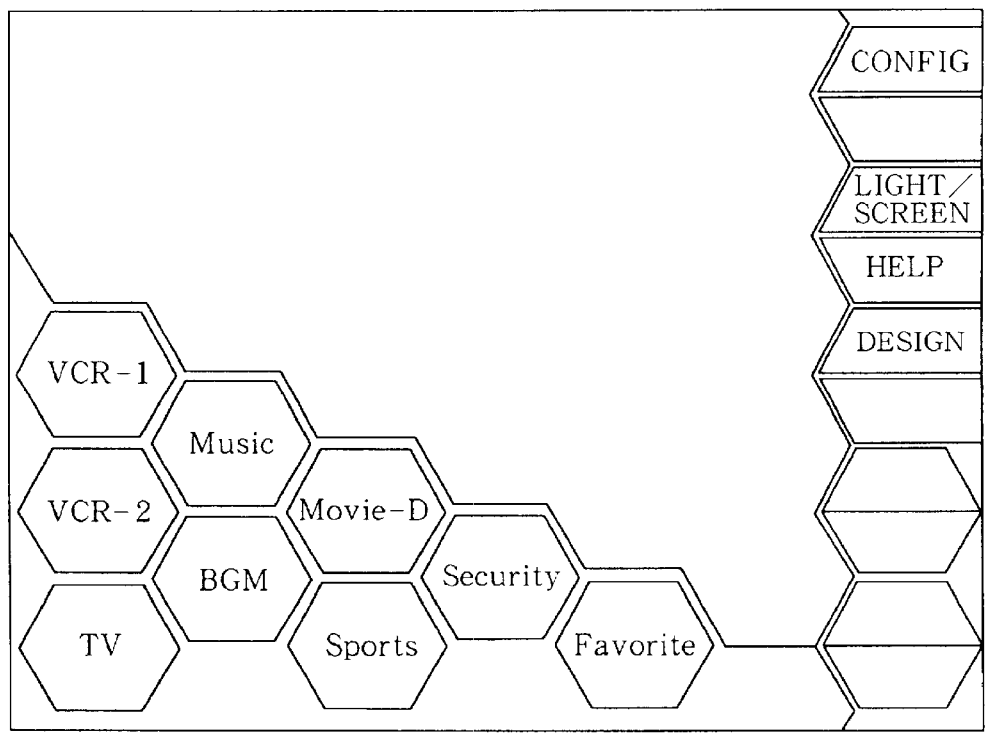
FIG. 2 is a diagram showing a top frame.

When the power supply for the AV control system of the invention is turned on, a top frame as shown in FIG. 2 is displayed on the screen of the touch panel input unit 2. Shown on the frame are a plurality of contents select buttons such as "VCR-1," "VCR-2," "TV," "MUSIC" and "SPORTS." When one of the contents select buttons is selectively manipulated, the required one or more of the AV devices are commanded to execute a predetermined operation corresponding to the button.

Figure 3:
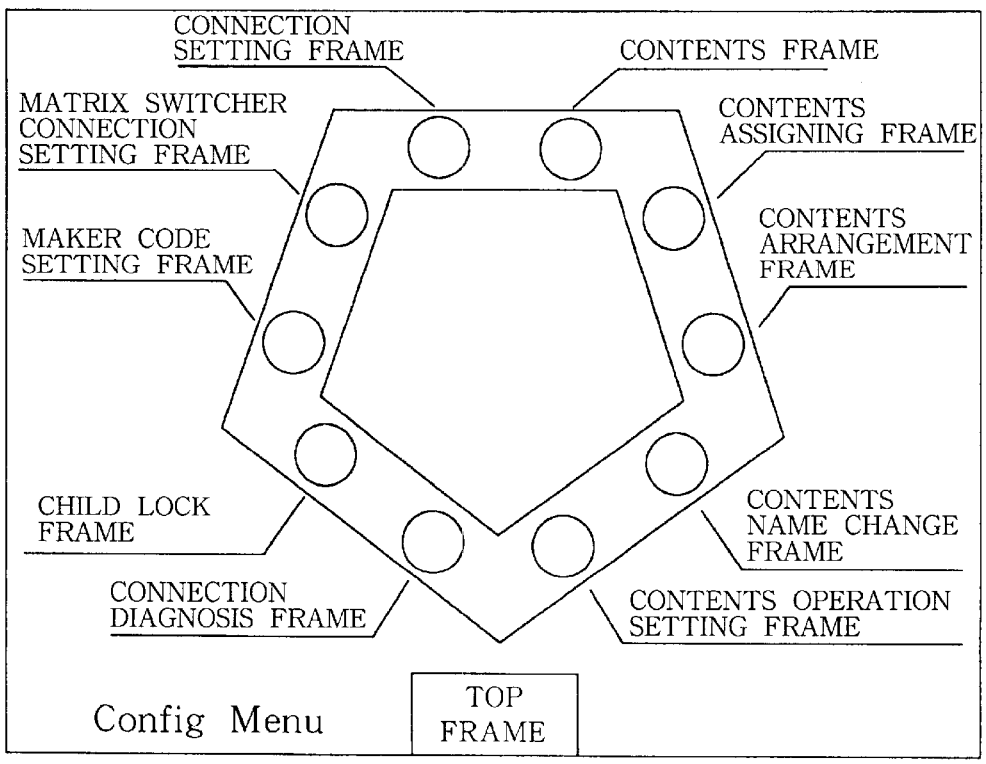
FIG. 3 is a diagram showing CONFIG frame.

Shown at the right upper corner of the top frame in FIG. 2 is "CONFIG" button which is to be manipulated to switch the display between a plurality of frames for setting various operations. When "CONFIG" button on the top frame is manipulated, CONFIG frame shown in FIG. 3 is displayed, in which manual buttons are shown for switching the display between a plurality of frames. These buttons include a "contents arrangement frame" button which is manipulated when desired one of the contents select buttons shown on the top frame is to be replaced with another contents select button.

Figure 4:
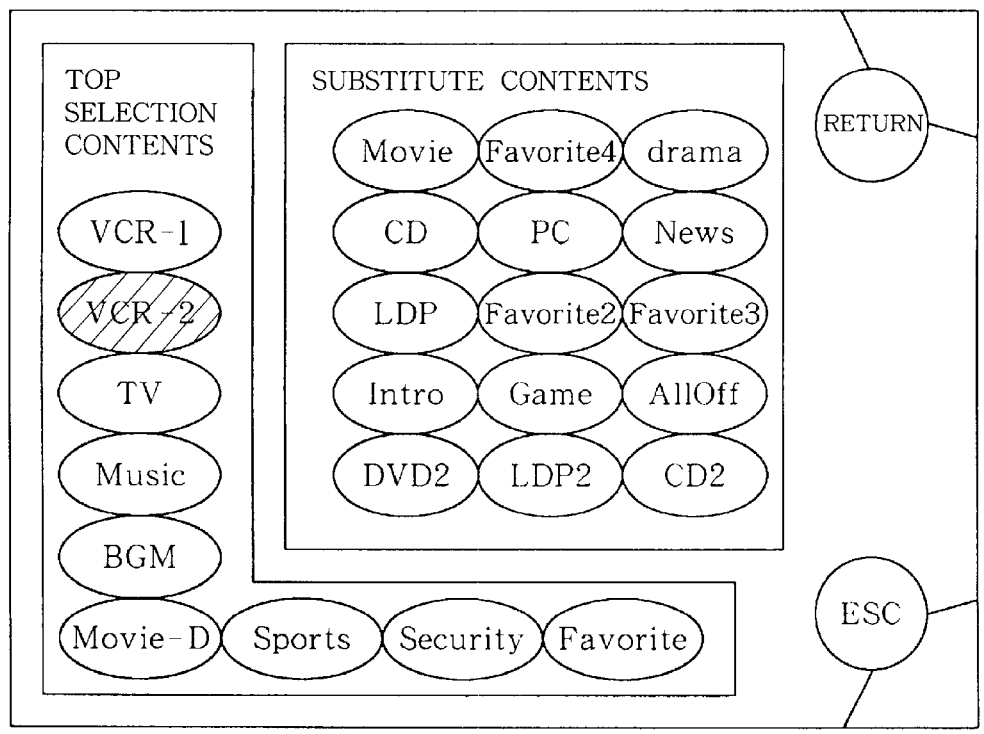
FIG. 4 is a diagram showing a contents arrangement frame before changing a contents arrangement.

When the "contents arrangement frame" button is manipulated, a contents arrangement frame shown in FIG. 4 is displayed. This frame comprises a top selection contents area showing the names of the nine contents select buttons to be displayed on the top frame, and a substitute contents area showing the names of fifteen substitute contents select buttons prepared in advance in addition to these content select buttons.

When one contents select button (e.g., "VCR-2") to be changed is manipulated first among the contents select buttons in the top selection contents area, this button is displayed as reversed.

Figure 5:
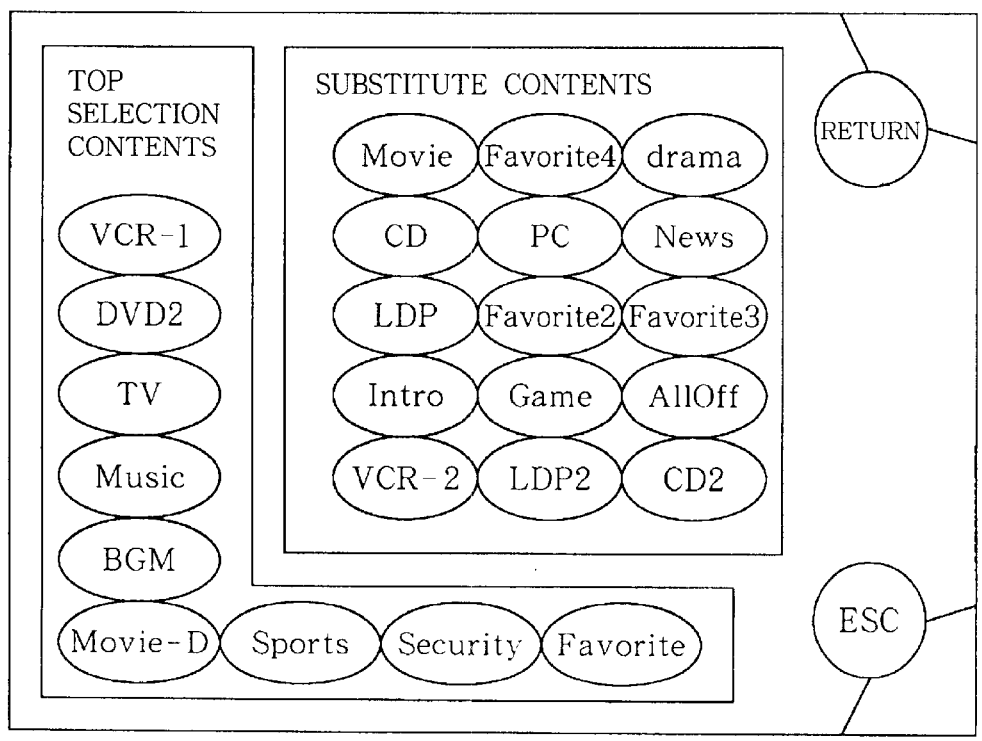
FIG. 5 is a diagram showing the contents arrangement frame after changing the contents arrangement.

When one contents select button (e.g., "DVD2") to be added anew to the top selection contents area is then selected from the substitute contents area, the button name selected from the top selection contents area and the button name selected from the substitute contents area are replaced with each other as shown in FIG. 5.

Figure 6:
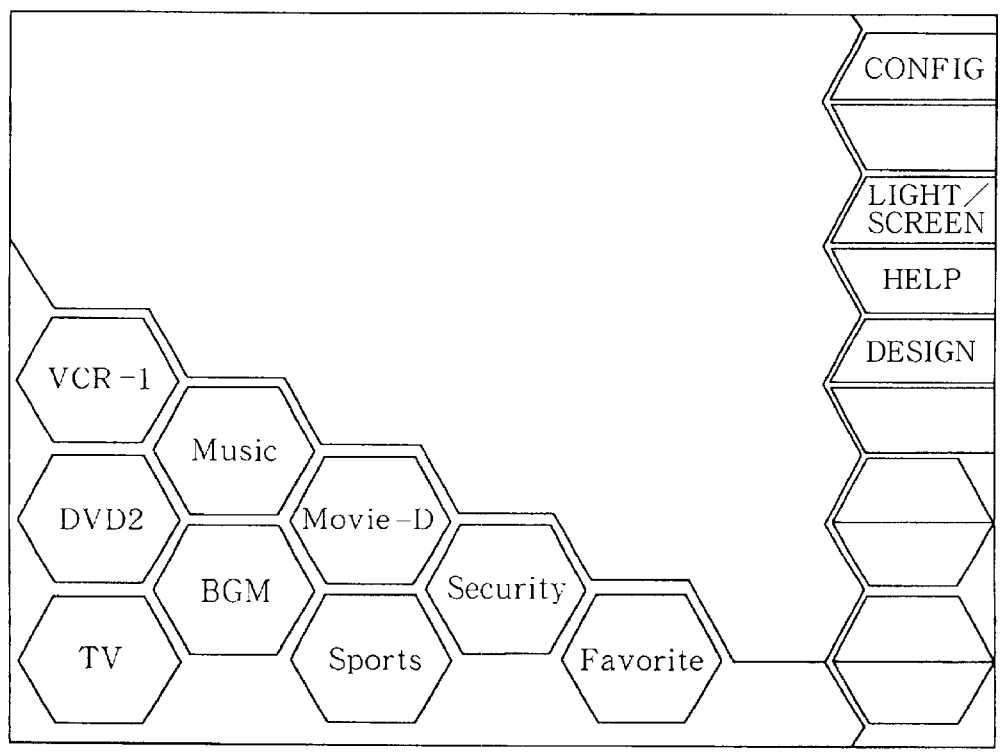
FIG. 6 is a diagram showing the top frame after changing the contents arrangement.

Subsequently, "RETURN" button is manipulated, whereupon a top frame shown in FIG. 6 is displayed. The old contents select button ("VCR-2") presented in the top frame of FIG. 2 before the change disappeared from the frame, and the new contents select button ("DVD2") is added to the frame.

Accordingly, if the new button is manipulated, a command is given to the required AV devices (e.g., DVD, liquid-crystal projector, AV amplifier) for predetermined operations (e.g., playback operation of DVD, display of images, production of sound) corresponding to the manipulated button to realize the predetermined operations.

Figure 7:
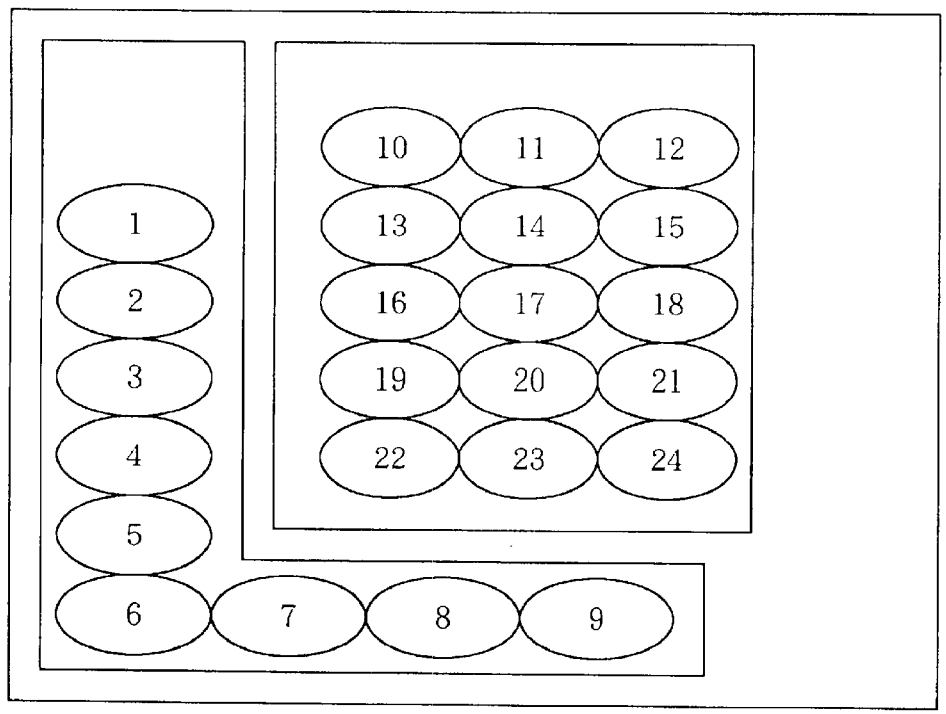
FIG. 7 is a diagram for illustrating button codes given in corresponding relation to the displayed positions of buttons on the contents arrangement frame.

With reference to FIG. 7, the button codes "1" to "24" are assigned to the display region of the screen of the touch panel input unit 2 in corresponding relation to the positions of the buttons shown on the contents arrangement frame of FIG. 4. When one button code is specified, the position of the corresponding button shown can be specified.

The controller 1 has stored therein a contents arrangement table as shown in FIG. 8. When the contents select button displayed on the input unit 2 is manipulated, the controller 1 controls one or more of the AV devices according to the table to realize the predetermined operation.

Listed in the contents arrangement table shown in FIG. 8 for each of the 24 contents select buttons are the above-mentioned button code ("1" to "24"), operation code ("F1" to "F24") giving a command for operation when the contents select button is manipulated, and the button name data ("VCR-1," "TV," etc.) of the contents select button to be displayed.

The button codes "1" to "9" are used for specifying both the position of display on the top frame and the display position on the contents arrangement frame. The button codes "10" to "24" are for use in specifying the display position on the contents arrangement frame.

The contents arrangement table is rewritten by changing the contents select button to be displayed on the top frame as described. For example, when the contents select button "VCR-2" in the top selection contents area and the contents select button "DVD2" in the substitute contents area are selected on the contents arrangement frame as in the case of the forgoing example, the table of FIG. 8 is rewritten as shown in FIG. 9, that is, the button codes "2" and "22" are replaced by each other with respect to the operation codes and the button name data.

With this replacement, the contents select button to be displayed at the position of the button code "2" on the top frame of the input unit 2 has its name on display changed to "DVD2" with reference to the new button name data "DVD2." When the button is then manipulated, the operation of the DVD is controlled with reference to the new operation code "F22."

Figure 10:
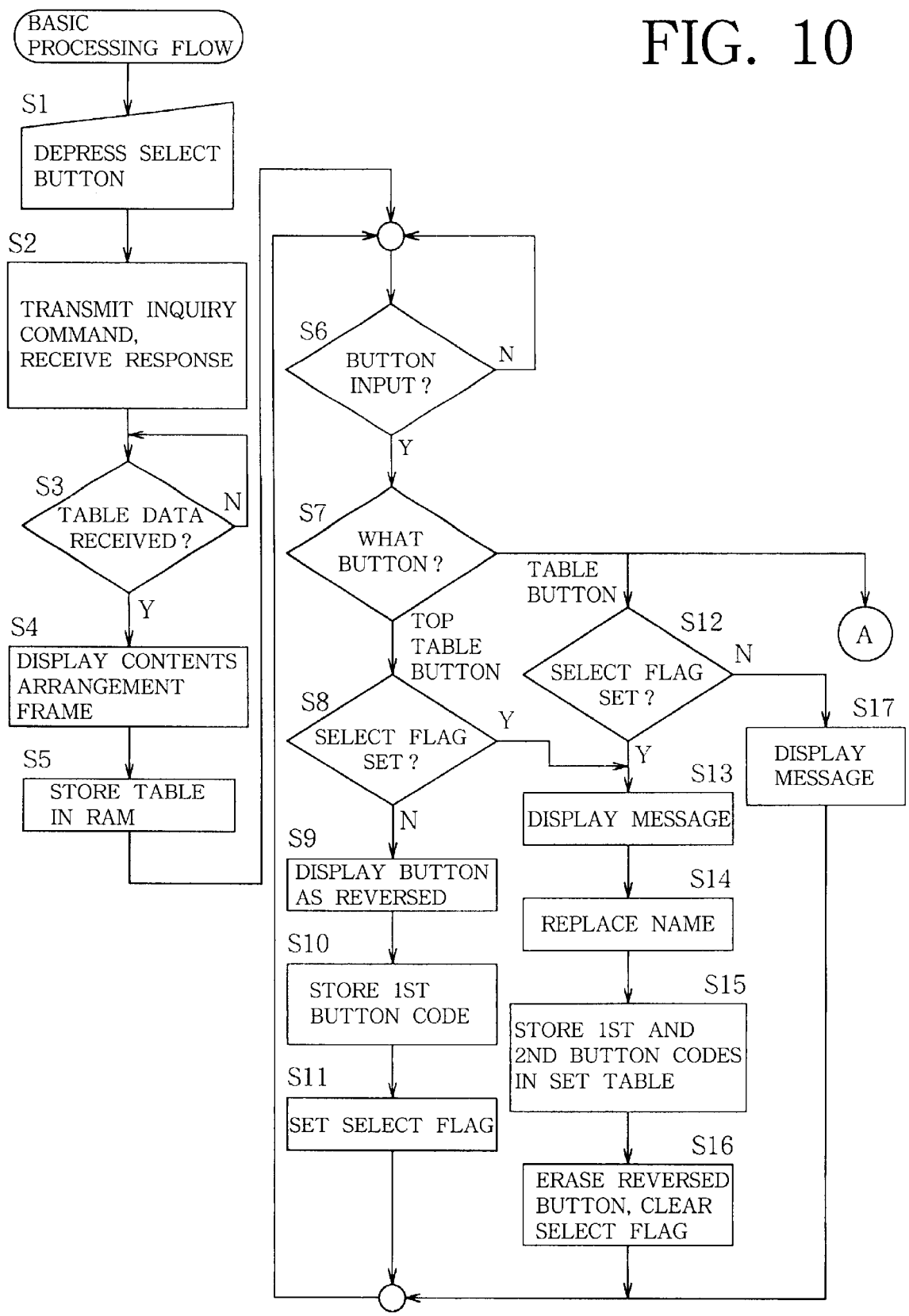
FIG. 10 is a flow chart showing part of contents arrangement changing procedure.
Figure 11:
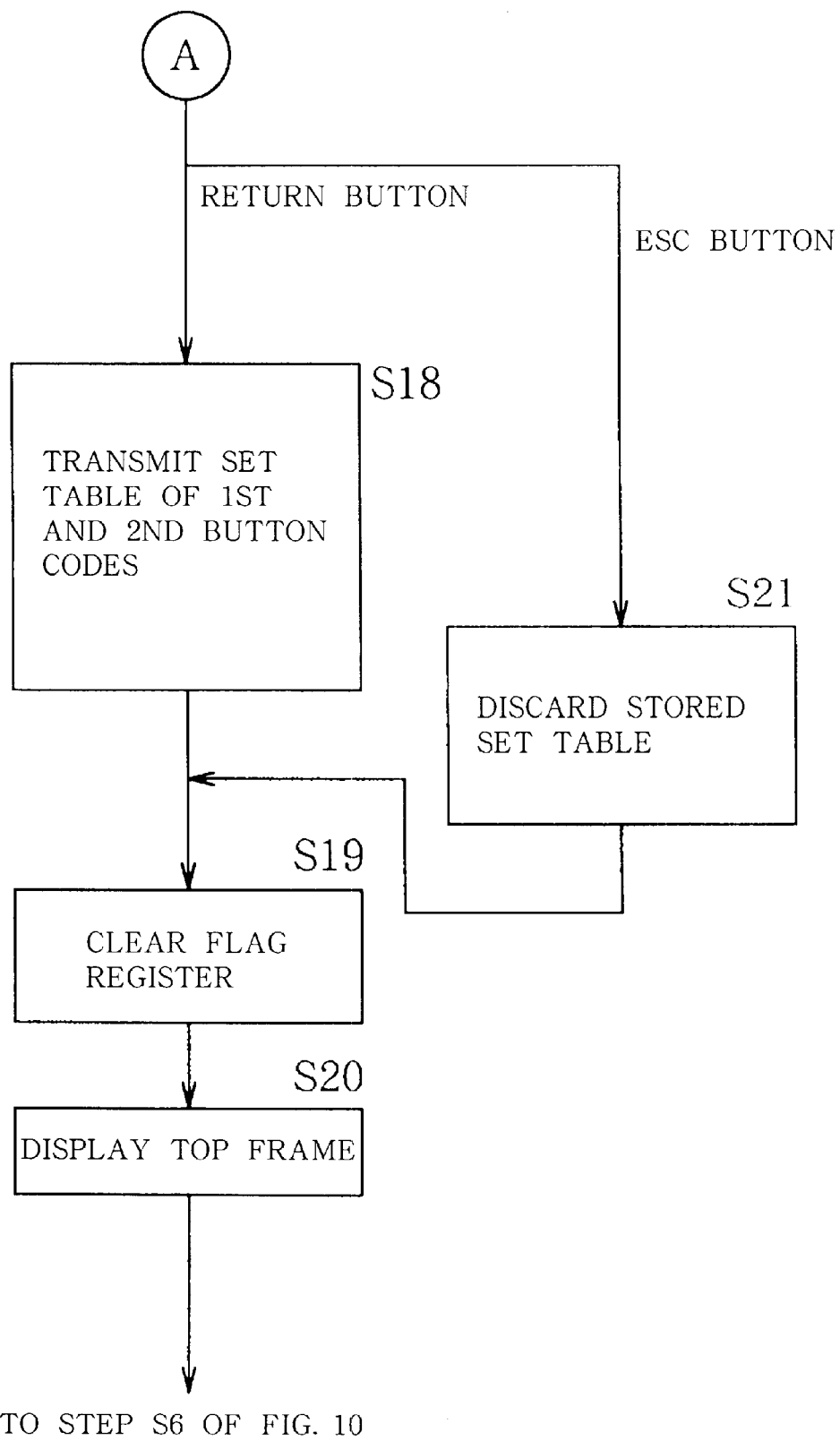
FIG. 11 is a flow chart showing the remainder of the procedure.

FIGS. 10 and 11 show the procedure (basic processing flow) to be performed by the input unit 2 for realizing the contents arrangement changing function.

First when the "contents arrangement frame" button is depressed on CONFIG frame of FIG. 3 in step S1 of FIG. 10, an inquiry command is transmitted in step S2 for reading the contents arrangement table from controller 1, and a response to the inquiry is received. Step S3 checks whether the data of the contents arrangement table is received. If the data has been received, the contents arrangement frame is displayed in step S4 as seen in FIG. 4, and the table is thereafter stored in a RAM in step S5.

An inquiry is thereafter made in step S6 as to whether there is any button input. When the answer is affirmative, step S7 identifies the button. If the button is found to be one (top table button) in the top selection contents area, an inquiry is made in step S8 as to whether a select flag is set. When the manipulation of the top table button is the first one, the inquiry is answered in the negative, followed by step S9.

The manipulated button is displayed as reversed in step S9, the button code of the manipulated button (first button code) is stored in step S10, the select flag is thereafter set in step S11, and the sequence returns to step S6. In the case where the top table button is thereafter manipulated again, the inquiry of step S8 is answered in the affirmative, followed by step S13.

On the other hand, when the button (table button) in the substitute contents area is manipulated, step S7 is followed by step S12, in which an inquiry is made as to whether the select flag is set. When manipulation of the top table button is followed by manipulation of the table button, the inquiry is answered in the affirmative, and the sequence proceeds to step S13.

Step S13 displays a message to the effect that the top table button is to be changed. Step S14 replaces the name of the top table button ("VCR-2") shown in the contents arrangement frame of FIG. 4 and the name of the table button ("DVD2") with each other (see FIG. 5). The button code of the button manipulated the second time (second button code) is stored.

The first button code and the second button code are subsequently stored in the set table in step S15, and the display of the manipulated button as reversed is cancelled in step S16, followed by step S6 again.

If the inquiry of step S12 is answered in the negative, a message is displayed in step S17 to the effect that a new button is to be manipulated after the contents button to be changed is manipulated first. The sequence thereafter returns to step S6.

When "RETURN" button is thereafter manipulated, the sequence proceeds from step S7 to step S18 of FIG. 11, in which the set table of the first and second button codes stored is transmitted to the controller 1. The flag register is cleared in step S19, the top frame is displayed in step S20, and the sequence returns to step S6 of FIG. 10.

When "ESC" button is manipulated, on the other hand, the sequence proceeds from step S7 to step S21 of FIG. 11, in which the stored set table is discarded, followed by step S19.

When the set table of the first and second button codes is transmitted from the touch panel input unit 2 to the controller 1 by the above procedure, the controller 1 in turn replaces the operation code and button name of the first button code in the contents arrangement table of FIG. 8 with those of the second button code in the table and vice versa (see FIG. 9).

Consequently, the top frame shows the new content select button ("DVD") as shown in FIG. 6. When this button is manipulated, a command is given to required one or more of the AV devices to perform the predetermined operation corresponding to the button.

Contents Name Changing Function

CONFIG frame shown in FIG. 3 includes a "contents name change frame" button for use in changing the name of each contents select button displayed on the top frame.

Figure 12:
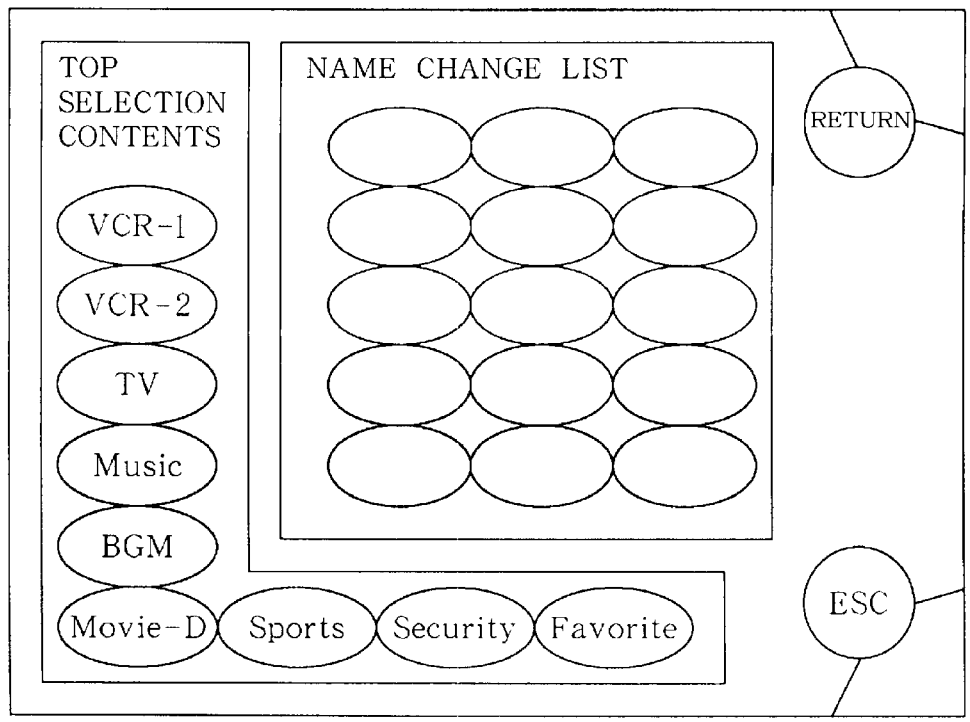
FIG. 12 is a diagram showing a contents name change frame.

When this button is manipulated, a contents name change frame shown in FIG. 12 is displayed. The contents name change frame has a top selection contents area showing the names of the nine contents select buttons to be displayed on the top frame, and a name change list area for displaying a name change list.

Figure 13:
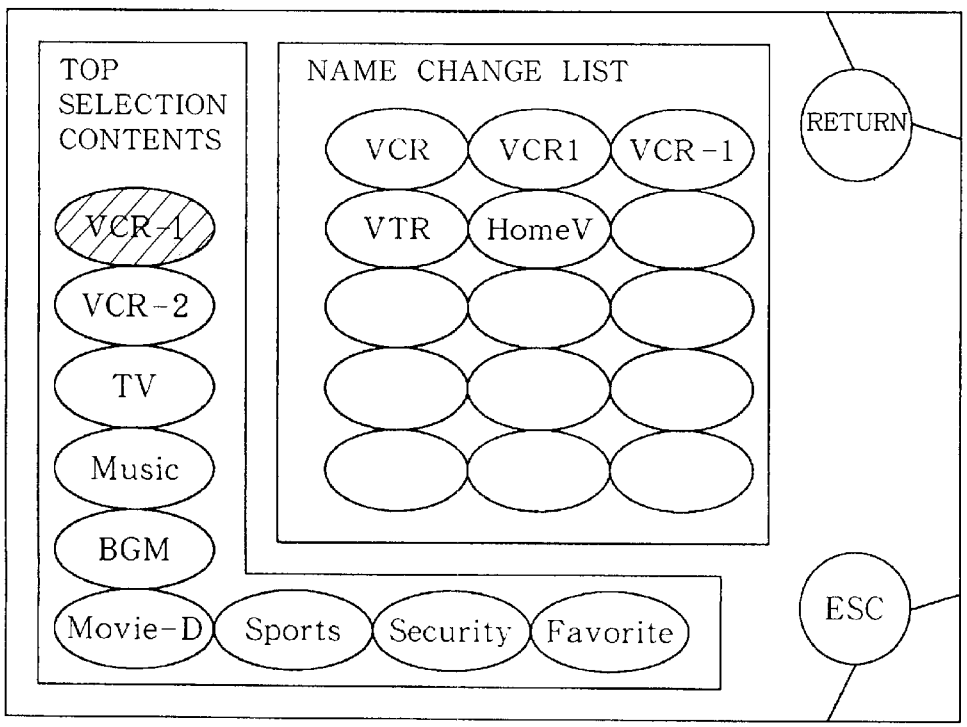
FIG. 13 is a diagram showing the contents name change frame with a name change list incorporated therein.

When one contents select button (e.g., "VCR-l") shown in the top selection contents area is manipulated, the name change list containing a plurality of button names to be given to the manipulated select button is displayed as seen in FIG. 13.

Figure 14:
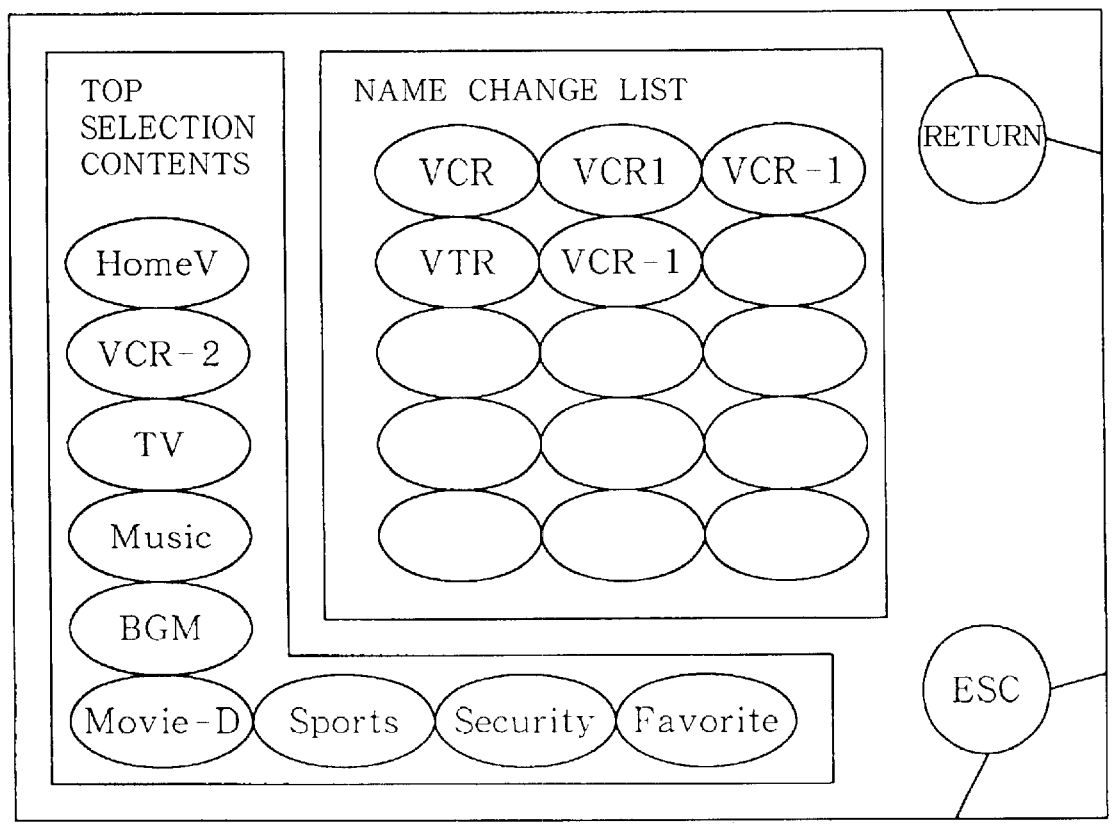
FIG. 14 is a diagram showing the contents name change frame after a contents name change.

Accordingly, a desired name (e.g., "HOME V") is selected from the list, whereupon the old name ("VCR-1") of the select button shown in the top selection contents area is changed for the new name ("HOME V") as shown in FIG. 14. The new name ("HOME V") in the name change list is also changed for the old name ("VCR-1").

With reference to FIGS. 12 and 13, the contents arrangement change means operable in the second frame is described by way of example. In FIG. 13, an undesirable one, for example, VCR-1, of the specified contents select buttons in the TOP SELECTION CONTENTS area is selected and a desirable one for example, HomeV, of the substitute buttons in the NAME CHANGE LIST, also referred to as SUBSTITUTE CONTENTS area, is selected. This results In the desirable one, HomeV, of the substitute buttons being moved into the TOP SELECTION CONTENTS area replacing the undesirable one, VCR-1, of the specified contents select buttons and the undesirable one, VCR-1, of the specified contents select buttons being moved into the SUBSTITUTE CONTENTS area replacing the desirable one, HomeV, of the substitute buttons that moved to the TOP SELECTION CONTENTS area as shown in FIG. 14. Further, as shown in FIG. 14, the desirable one, HomeV, of the substitute buttons thereafter is displayed in the first frame with remaining ones of the specified contents select buttons and is available for commanding one or more of the devices.

Figure 18:
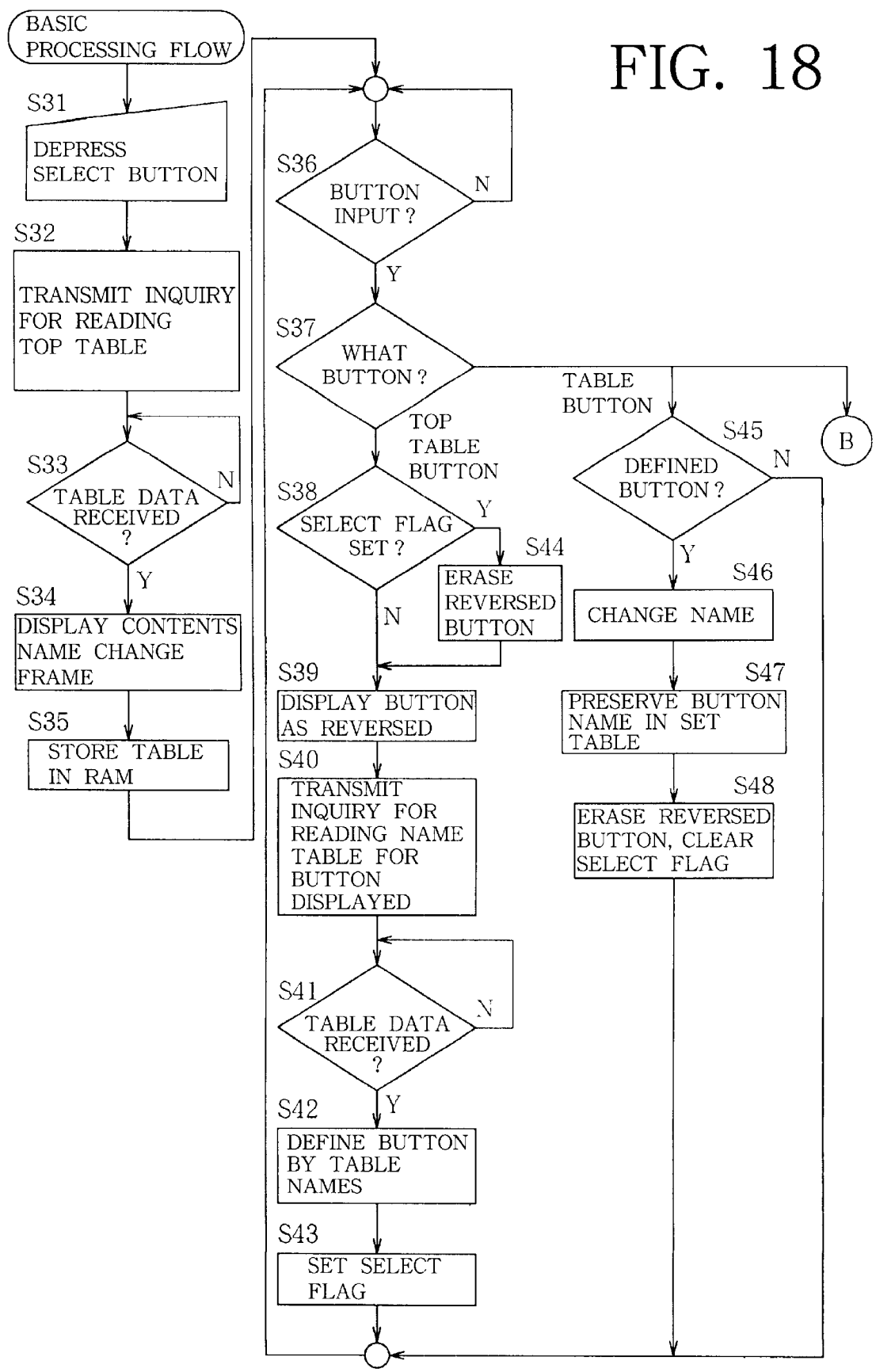
FIG. 18 is a flow chart showing part of a contents name changing procedure.
Figure 19:
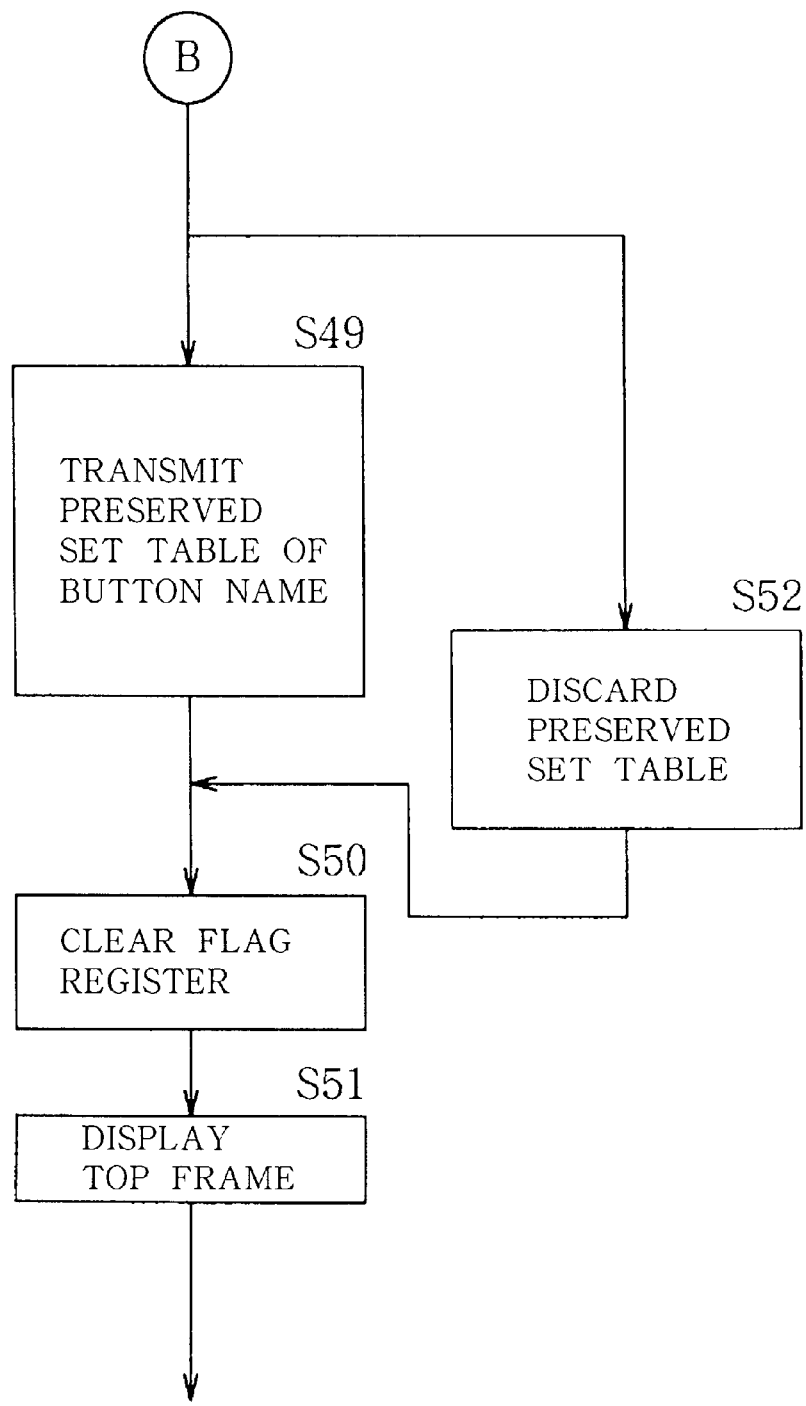
FIG. 19 is a flow chart showing the remainder of the procedure.

FIGS. 18 and 19 show the procedure (basic processing flow) to be performed by the touch panel input unit 2 for realizing the contents name changing function.

When the "contents name change frame" button is first depressed on CONFIG frame of FIG. 3 in step S31 of FIG. 18, an inquiry command is transmitted for reading from the controller 1 a content arrangement table (top table) relating only to the nine contents select buttons shown on the top frame as seen in FIG. 15, and a response to the inquiry is received in step S32. Step S33 inquires whether the data as to the contents name change table has been received. If the answer is affirmative, the contents name change frame of FIG. 12 is displayed in step S34, and the table is stored in a RAM in step S35.

An inquiry is thereafter made in step S36 as to whether there is any button input. When the answer is affirmative, step S37 identifies the button. If the button is found to be one (top table button) in the top selection contents area, an inquiry is made in step S38 as to whether a select flag is set. When the manipulation of the top table button is the first one, the inquiry is answered in the negative, followed by step S39, in which the manipulated button is displayed as reversed. If the manipulation of the top table button is the second time, on the other hand, the answer is found to be affirmative, followed by step S44 to erase the button displayed as reversed by the first button manipulation. Subsequently in step S39, the button manipulated the second time is displayed as reversed.

An inquiry command is transmitted in the next step S40 for reading from the controller 1 a name table shown in FIG. 16 for the content select button being displayed as reversed, and a response to the inquiry is received. The name table shown in FIG. 16 contains a plurality of button names (such as "VCR" and "VCR1") prepared so as to be given to the contents select button being displayed as reversed, along with button codes ("10" to "14") for specifying positions of display on the name change list area shown in FIG. 14. The name table is prepared for all the contents select buttons in advance and registered in the controller 1.

Step S41 inquires whether the name table data has been received. If the answer is affirmative, the button names contained in the received name table are assigned in step S42 to respective button display positions in the name change list area with reference to the button codes as seen in FIG. 13 for the definition of the button. Subsequently, the select flag is set in step S43, followed by step S36 again.

When the name button (table button) in the name change list area is thereafter manipulated, the sequence proceeds from step S37 to step S45 to inquire whether the manipulated button has already been defined. If the answer is affirmative, step S46 follows, in which the old name shown in the top selection contents area and the new name shown in the name change list area are replaced with each other as shown in FIG. 14.

Next in step S47, the new button name is preserved in a set table along with the button code. Further in step S48, the manipulated button displayed as reversed is erased, and the select flag is cleared, whereupon the sequence returns to step S36.

When "RETURN" button is thereafter manipulated, the sequence proceeds from step S37 to step S49 of FIG. 19, in which the set table of the button name preserved is transmitted to the controller 1. The flag register is cleared in step S50, the top frame is displayed in step S51, and the sequence returns to step S36 of FIG. 18.

When "ESC" button is manipulated, on the other hand, the sequence proceeds from step S37 to step S52 of FIG. 19, in which the preserved set table is discarded, followed by step S50.

Figure 17:
FIG. 17 is a diagram showing the top table after a name change.

When the set table of the button name is transmitted from the touch panel input unit 2 to the controller 1 by the above procedure, the controller 1 in turn rewrites the content arrangement table as shown in FIG. 17. More specifically, the button name contained in the set table and corresponding to the button code "1" is changed from the old name ("VCR-1") to the button name ("HOME V") contained in the set table.

Consequently, the new button name ("HOME V") is shown instead of the old name (VCR-1") in the top frame shown of FIG. 6. When the select button is manipulated, a command is given to required one or more of the AV devices to perform the predetermined operation corresponding to the button.

The system of the present invention is not limited to the foregoing embodiment in construction but can be modified variously by one skilled in the art without departing from the spirit of the invention as set forth in the appended claims.

What is claimed is:

1. An audio-video control system comprising a controller having connected thereto a plurality of devices including audio-video devices, the controller comprising an image display screen and an input unit enabling the user to perform input manipulations on the image display screen for controlling the operation of the plurality of devices in accordance with the manipulation of the input unit, the audio-video control system being characterized in that the controller comprises:

contents select button display means for displaying in a first frame on the image display screen specified contents select buttons selected from among a plurality of contents select buttons, the specified contents select buttons prepared for commanding a specified one or more of the devices to perform a predetermined operation, operation command means for commanding in the first frame the specified one or more of the devices to perform the predetermined operation in accordance with manipulation of one of the specified contents select buttons displayed by the contents select button display means, contents arrangement frame display means for displaying, in a second frame on the image display screen, the specified contents select buttons disposed in a selection contents area and remaining ones of the plurality of contents select buttons disposed in a substitute contents area, the remaining ones of the plurality of contents select buttons being substitute buttons, and contents arrangement change means, operable in the second frame wherein an undesirable one of the specified contents select buttons in the selection contents area is selected and a desirable one of the substitute buttons in the substitute contents area is selected resulting in the desirable one of the substitute buttons being moved into the selection contents area replacing the undesirable one of the specified contents select buttons and the undesirable one of the specified contents select buttons being moved into the substitute contents area replacing the desirable one of the substitute buttons that moved to the selection contents area, the desirable one of the substitute buttons thereafter being displayed in the first frame with remaining ones of the specified contents select buttons and being available for commanding one or more of the devices.

2. An audio-video control system according to claim 1 wherein the controller comprises:

means for storing a contents arrangement table containing for each of the contents select buttons a button code for specifying the position of the select button displayed on the screen, an operation code for specifying an operation when the select button is manipulated, and button name data showing the name of the select button to be displayed on the screen, and the contents arrangement change means replaces the two manipulated contents select buttons with each other with respect to the operation codes and the button name data in the contents arrangement table.

3. An audio-video control system comprising a controller having connected thereto a plurality of devices including audio-video devices, the controller comprising an image display screen and an input unit enabling the user to perform input manipulation on the image display screen for controlling the operation of the plurality of devices in accordance with the manipulation of the input, the audio-video control system being characterized in that the controller comprises:

contents select button display means for displaying, in a first frame on the image display screen a plurality of contents select buttons prepared for commanding a specified one or more of the devices to perform a predetermined operation, each one of the plurality of contents select buttons being associated with an original button name with each original button name being displayed on the contents select button display means representative of each contents select button, operation command means for commanding the specified one or more of the devices to perform a predetermined operation in accordance with manipulation of a named one of the plurality of contents select buttons, name change list display means for displaying in a second frame a list of a plurality of button names corresponding to the plurality of contents select buttons disposed in a selection contents area and a plurality of alternative button names disposed in a name change list area, and name change control means, operable in the second frame wherein an undesirable button name of one of the plurality of contents select buttons in the selection contents area is selected and a desirable alternative button name in the name change list area is selected resulting in the desirable alternative button name being moved into the selection contents area replacing the undesirable button name of the selected one of the contents select buttons and the undesirable button name of the selected one of the contents select buttons being moved into the name change list area replacing the desirable alternative button name that moved to the selection contents area, the desirable alternative button name thereafter being displayed in the first frame with remaining ones of the button names of the plurality of contents select buttons.

4. An audio-video control system according to claim 3 wherein the controller comprises:

means for storing a contents arrangement table containing for each of the contents select buttons a button code for specifying the position of the select button displayed on the screen, an operation code for specifying an operation when the select button is manipulated, and button name data showing the name of the select button to be displayed on the screen, and contents name table store means having stored therein a plurality of button names for each of the contents select buttons, and the name change control means causes the arrangement table storing means and the name table store means to transfer the button names therein to each other.

* * * * *